United States Patent
Mulberry

[19]

[11] Patent Number: 6,125,837
[45] Date of Patent: Oct. 3, 2000

[54] GRILL

[76] Inventor: Michael Scott Mulberry, 2031 Powers Ferry Trace, Marietta, Ga. 30067

[21] Appl. No.: 09/253,368

[22] Filed: Feb. 22, 1999

Related U.S. Application Data

[60] Provisional application No. 60/078,711, Mar. 20, 1998.

[51] Int. Cl.[7] .................................................. A47J 37/00
[52] U.S. Cl. ........................... 126/41 R; 126/8; 126/39 J; 99/447
[58] Field of Search .......................... 126/8, 25 R, 41 R, 126/144–151, 39 R, 1 F, 39 J, 92 R, 91 R, 92 AC, 92 B, 39 D, 273.5 R, 512; 431/347, 124, 125; 99/401, 451, 447

[56] References Cited

U.S. PATENT DOCUMENTS

| | | | |
|---|---|---|---|
| 462,921 | 11/1891 | Gibbons | 128/41 R |
| 1,699,624 | 1/1929 | O'Dowd | 126/39 J |
| 3,938,495 | 2/1976 | Bauer | 126/41 R |
| 4,089,258 | 5/1978 | Berger | 126/39 J |
| 5,156,140 | 10/1992 | Zisman | 126/41 R |
| 5,190,027 | 3/1993 | Miceli | 126/41 R |
| 5,676,049 | 10/1997 | Arnold | 126/41 R |

FOREIGN PATENT DOCUMENTS

| | | | |
|---|---|---|---|
| 767795 | 7/1934 | France | 126/39 J |
| 8564 | 1/1980 | Japan | 126/151 |

*Primary Examiner*—James C. Yeung
*Attorney, Agent, or Firm*—Kennedy, Davis & Hodge, LLP

[57] ABSTRACT

A grill (10) is provided having a combustion chamber (11) which includes a tub (13) and a hood (15) pivotally mounted to the tub. The tub has an metallic, exterior shell (26) and an interior insulative liner (27) made of cementitious material, such as calcium aluminate, mounted within the exterior shell. The exterior shell has a front wall (29), a back wall (30), two end walls (31) and a floor (32). The insulative liner (27) has a back panel (35) mounted adjacent tub back wall and two end panels (36) mounted adjacent to corresponding tub side walls. The insulative liner panels have a faux brick exterior surface (55) which provides an undulating heat reflecting surface.

21 Claims, 2 Drawing Sheets

GRILL

This application claims the benefit of U.S. Provisional Application Ser. No. 60/078,711, entitled Gas Grill filed Mar. 20, 1998 in the United States Patent and Trademark Office.

TECHNICAL FIELD

The present invention is directed to gas grills and more particularly to gas grills having insulated walls.

BACKGROUND OF THE INVENTION

Gas grills have existed for many years. Today's gas grills typically include a lower tub mounted upon legs or a pedestal, and a hood adapted to mate with the top of the tub. The grill also includes a food grate mounted to the top of the tub and a gas burner mounted with the tub and below a food grate.

In use, the heat emitted from the ignited gas burner heats food placed upon the grate. This heat however also heats the side walls of the tub to very high temperatures. These heated side walls pose a fire hazard should the tub walls be positioned too close to a flammable material and a safety hazard to humans, especially small children which may not realize that the grill becomes very hot during use. For these reasons some grills have been designed which incorporate means to insulate or shield the exterior walls of the tub.

One manner of insulating the exterior wall of a grill has been the construction of a tub having an inner wall spaced from an outer wall. This type of grill is shown in U.S. Pat. Nos. 3,424,145, 4,813,398 and 5,406,930. However, as these grills are typically made of a metal which may still reach high temperatures, especially since metal brackets are often used to couple the inner and outer walls. These metal brackets bridge and therefore conduct heat from the inner wall to the outer wall.

Grills have also been designed having fiberglass or vermiculite liners which insulate the tub, as shown in U.S. Pat. Nos. 3,286,620, 4,582,041, 4,813,397 and 5,024,208. While these material may provide an adequate insulation of the tub they also prevent heat from being absorbed by the grill which may be utilized should food be returned to the grill for further cooking. In other words, these grills quickly cool requiring the re-ignition of the gas burner should heat to be required to complete the cooking of food previously removed from the grill.

Accordingly, it is seen that a need remains for a grill which is designed to restrict the exterior surface from reaching a dangerously high temperature but which retains enough heat for a sufficient period in the event additional cooking is necessary once the grill has been turned off. It is to the provision of such therefore that the present invention is primarily directed.

SUMMARY OF THE INVENTION

In a preferred form of the invention a grill comprises a housing having a tub and a hood configured to mate with the tub. The tub has a front wall, a rear wall, a pair of side walls extending between the front wall and the rear wall, and a floor extending between the side walls and between the front wall and the rear wall. The grill also includes a burner assembly mounted within the tub, a cooking grill coupled to the tub, and a first cementitious panel mounted to at least one wall of the tub.

DETAILED DESCRIPTION

Figure 1:
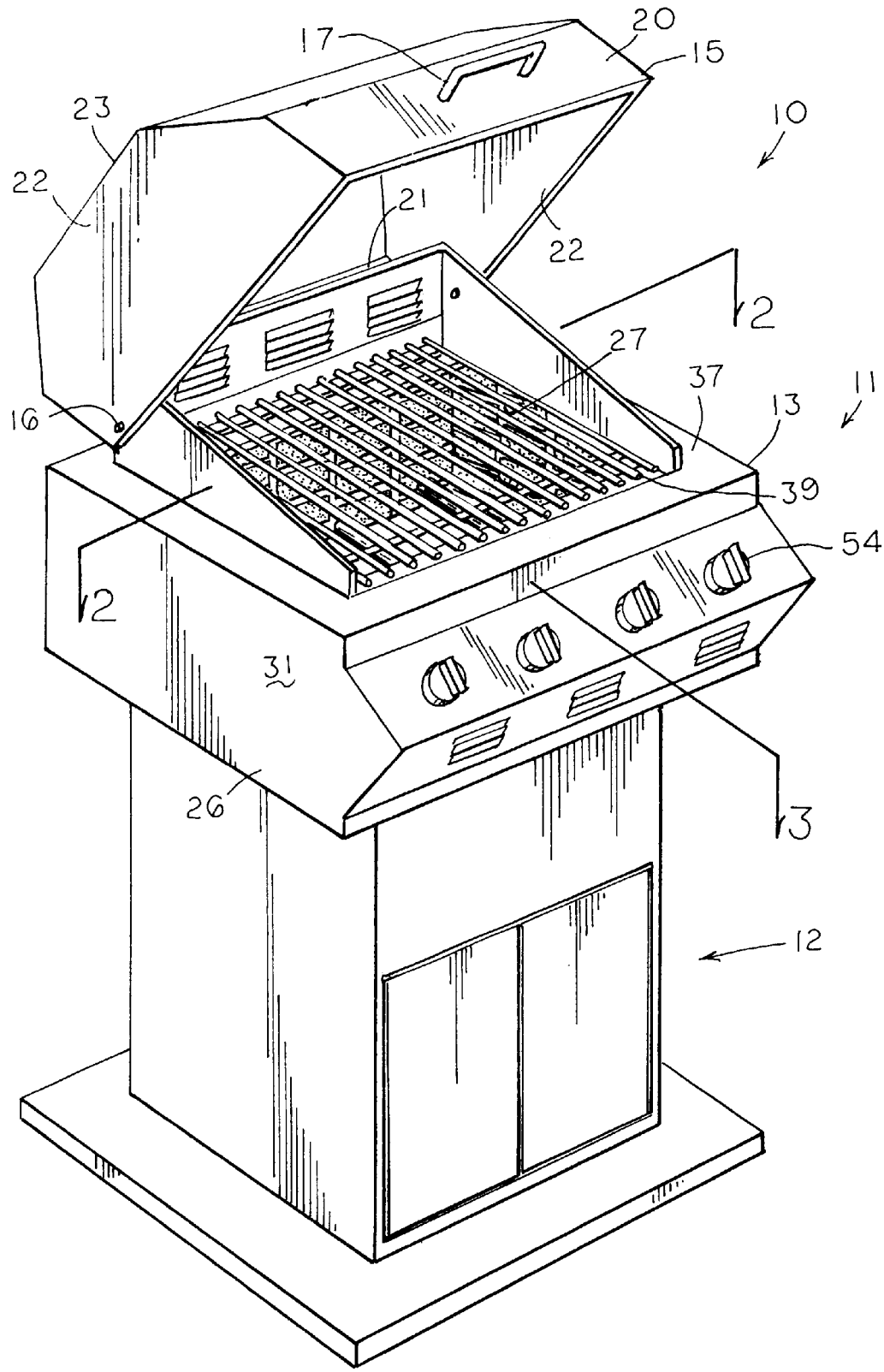
FIG. 1 is a perspective view of a gas grill embodying principles of the invention in a preferred form.
Figure 2:
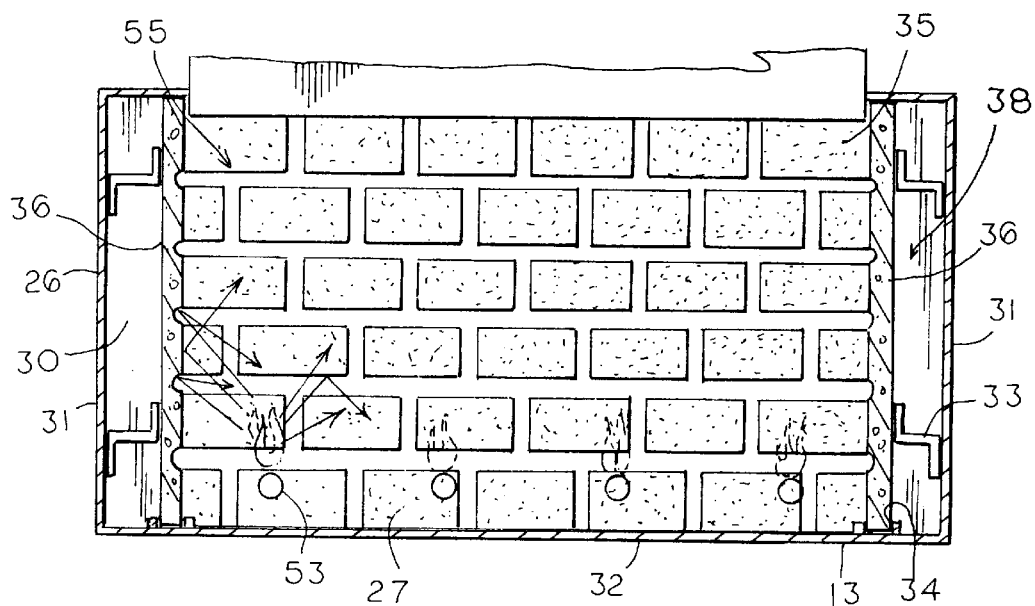
FIG. 2 is a cross-sectional view of a portion of the gas grill tub taken along plane 2—2.
Figure 3:
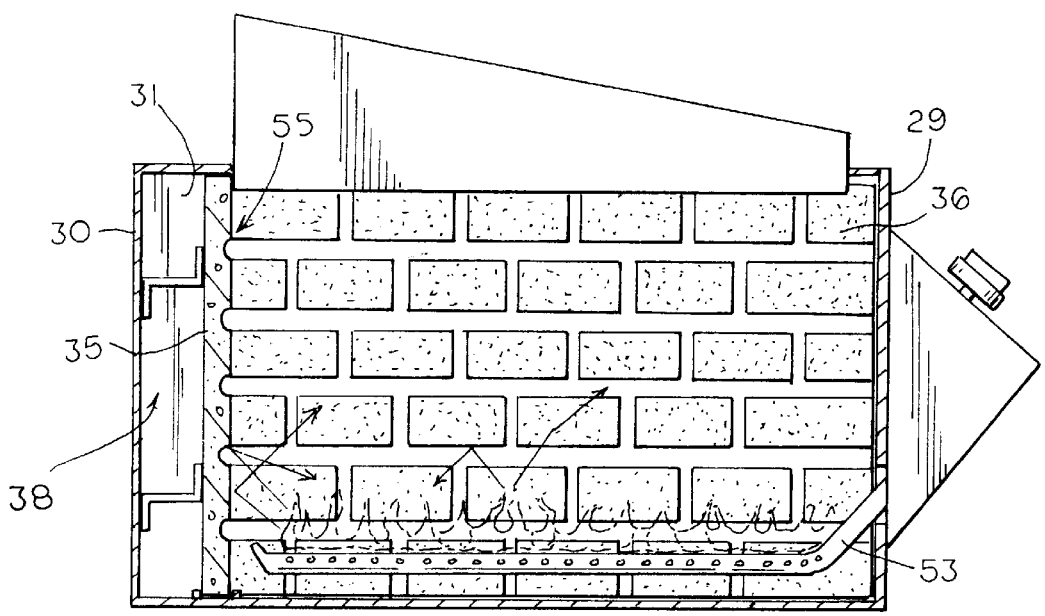
FIG. 3 is a cross-sectional view of a portion of the gas grill tub taken along plane 3—3.

Referring next to the drawings, there is a shown a gas grill 10 in a preferred embodiment. The gas grill 10 has a combustion chamber or housing 11 mounted upon a pedestal 12. The combustion chamber 11 has a bottom portion or tub 13 and a top portion or hood 15 pivotally mounted to the tub 13 by hinges 16. The hood 15 has a handle 17 mounted thereto. The hood 15 has a front wall 20, a back wall 21, two end walls 22 and a top wall 23.

The tub 13 has an metallic, exterior shell 26 and an interior insulative liner 27 made of cementitious material, such as calcium aluminate, mounted within the exterior shell 26. The exterior shell 26 has a front wall 29, a back wall 30, two end walls 31 and a floor 32. The insulative liner 27 has a back panel 35 mounted adjacent tub back wall 30 and two end panels 36 each of which is mounted adjacent to a corresponding tub end walls 31. The insulative panels are coupled to the tub by brackets 33 extending between the exterior shell and the surface of the panel facing the exterior shell. The bottom edge of each panel may rest within a trough 34 in floor 32 for stability. The insulative liner panels 35 and 36 have a faux brick exterior surface 55 which provides an undulating surface which reflects a portion of the heat directed upon the surface 55. A top plate 37 extends over and between the top edges of the exterior shell 26 and insulative liner 27. The insulative liner panels 35 and 36 are spaced from the corresponding walls of the exterior shell so as to create an insulative air space 38 therebetween. A grate 39 is mounted to the top plate 37 in a position adjacent the top edges of the insulative liner 27.

A four plenum burner 53 is mounted within the tub 13 adjacent the floor 32. Each burner 53 is coupled to a pressurized gas supply, shown as gas bottle, the flow of which is controlled to each burner 53 by a control valve 54.

As such, the tub exterior shell is insulated from the heat generated by the gas burner by both the insulative liner 27 and the insulative air space 38. This dual insulation of the exterior shell prevents it from becoming dangerously hot to the touch.

The undulating surface of the insulative liner also reflects a portion of the heat produced by the burners in different directions within the tub. This uneven reflection of the heat causes an even heating or oven effect below the grate 39, as illustrated by the arrows in FIGS. 1 and 4. The even distribution of the heat prevents "cold spots" from occurring along the grate. The elimination of such cold spots allows articles of food position throughout the entire grate surface to be cooked with generally the same amount of heat.

The heat absorption qualities of the cementitious liner material causes a portion of the heat produced by the burners to be absorbed. As such, the grill maintains a high heating quality long after the burners have been extinguished. This high quantity of retained heat allows one to return articles of food to the grate to be cooked even though the burner is not currently operating. Obviously, this advantage also allows a more rapid heating of the interior of the combustion chamber should the burner be re-ignited for further cooking, which minimizes the use of the combustible gas. Even though the cementitious material of the liner of the present invention is capable of absorbing heat along a portion of the liner facing the burner so as to maintain heat within the interior after the burner has been extinguished, this material has been found to have good insulative qualities to prevent heat from being conducted through the entire depth of the liner so as to restrict the exterior shell from becoming dangerously hot to the touch. This dual purpose material is a distinct advantage over the prior art grills embodying double metal walls which provided some insulative qualities, but still transferred an abundance of heat to the exterior wall due to the metal construction of these grills and these metal, heat conducting bridging brackets. Furthermore, this material is also a distinct advantage over the prior art grills having fiberglass or vermiculite liners which insulated the exterior wall but which enabled to grill to quickly cool, hampering the return of food to the grill for further cooking once the burner is extinguished. Additionally, it should be understood that by mounting the brackets upon the surface of the panel opposite the burner, and not having the brackets extend around the edges of the liner or completely through the liner, the brackets do not acta s a bridge to conduct heat to the exterior walls.

It should be understood that cementitious panels may also be added to the tub front wall as well as the walls of the hood.

While this invention has been described in detail with particular reference to the preferred embodiment thereof, it should be understood that many modifications, additions and deletions, in addition to those expressly recited, may be made thereto without departure from the spirit and scope of invention as set forth in the following claims.

What is claimed is:

1. A grill comprising
   a housing having a tub and a hood configured to mate with said tub, said tub having a front wall, a rear wall, a pair of side walls extending between said front wall and said rear wall, and a floor extending between said side walls and between said front wall and said rear wall;
   a burner assembly mounted within said tub;
   a cooking grill coupled to said tub, and
   a first, generally planar cementations panel mounted to at least one wall of said tub, said planar cementitious panel having an undulating exterior surface facing said burner assembly, said planar cementitious panel being oriented generally vertical;
   a second generally planar, generally vertical cementitious panel mounted to another wall of said tub;
   a third generally planar, generally vertical cementitious panel mounted to another wall of said tub;
   said first panel and said third panel being oriented generally parallel to each other, and said second panel extending between and generally normal to said first and third panels,
   whereby the first, second and third panels form heat reflecting corners which provide an even cooking temperature across the cooking grill.

2. The grill of claim 1 wherein said cementitious panel is spaced from said one wall to form an air space therebetween.

3. The grill of claim 2 where said floor has a groove therein and wherein said first cementitious panel has a bottom edge sized and shaped to be received within said groove.

4. The grill of claim 3 further comprising at least one bracket extending between said tub and the interior surface of said first cementitious panel facing said tub.

5. The grill of claim 2 further comprising at least one bracket extending between said tub and the interior surface of said first cementitious panel facing said tub.

6. The grill of claim 1 wherein said second cementitious panel has an undulating exterior surface.

7. The grill of claim 1 wherein said third cementitious panel has an undulating exterior surface.

8. The grill of claim 1 further comprising a fourth cementitious panel mounted to another said wall of said tub.

9. The grill of claim 1 further comprising three additional cementitious panels coupled to said first cementitious panel so as to form a generally rectangular, insulative sleeve.

10. A grill comprising
    a housing having a tub and a hood configured to mate with said tub, said tub having a front wall, a rear wall, a pair of side walls extending between said front wall and said rear wall, and a floor extending between said side walls and between said front wall and said rear wall;
    a burner assembly mounted within said tub;
    a cooking grill coupled to said tub;
    a first generally planar insulative panel mounted to at least one wall of said tub, said first insulative panel having an undulating exterior surface facing said burner assembly,
    a second generally planar insulative panel mounted to at least one wall of said tub, said second insulative panel having an undulating exterior surface facing said burner assembly,
    a third generally planar insulative panel mounted to at least one wall of said tub, said third insulative panel having an undulating exterior surface facing said burner assembly,
    said first panel and said third panel being oriented generally vertical and generally parallel to each other, and said second panel extending between and generally normal to said first and third panels,
    whereby the first, second and third panels form heat reflecting corners which provide an even cooking temperature across the cooking grill.

11. The grill of claim 10 wherein said cementitious panel is spaced from an adjacent said wall of said housing tub to form an air space therebetween.

12. The grill of claim 11 where said floor has a groove therein and wherein said first cementitious panel has a bottom edge sized and shaped to be received within said groove.

13. The grill of claim 12 further comprising at least one bracket extending between said tub and the interior surface of said first insulative panel facing said tub.

14. The grill of claim 11 further comprising at least one bracket extending between said tub and the interior surface of said first insulative panel facing said tub.

15. The grill of claim 10 wherein said second cementitious panel is spaced from an adjacent wall of said housing tub to form a space therebetween.

16. The grill of claim 10 further comprising a fourth insulative panel mounted to another said wall of said tub.

17. The grill of claim 10 further comprising three additional insulative panels coupled to said first cementitious panel so as to form a generally rectangular, insulative sleeve.

18. The grill of claim 17 wherein at least two said insulative panels have undulating exterior surfaces.

19. A grill comprising
    a housing having a tub and a hood configured to mate with said tub;
    a burner assembly mounted within said tub;
    a cooking grill coupled to said tub;
    a first generally planar, cementitious insulative sleeve mounted adjacent the interior of said tub having an undulating exterior surface facing said burner assembly;

a second generally planar, cementitious insulative sleeve mounted adjacent the interior of said tub having an undulating exterior surface facing said burner assembly; and a third generally planar, cementitious insulative sleeve mounted adjacent the interior of said tub having an undulating exterior surface facing said burner assembly, said third generally planar sleeve being joined to said first and second sleeves to form insulated corners, whereby the insulated corners reflect heat so as to evenly distribute heat across the cooking grill.

20. The grill of claim 19 wherein said cementitious insulative sleeve is spaced from said tub to create an air space therebetween.

21. The grill of claim 19 wherein said cementitious insulative sleeve is spaced from said tub to create an air space therebetween.

* * * * *